United States Patent Office 3,033,837
Patented May 8, 1962

3,033,837
THIOUREA HALOGENATION OF RUBBERY COPOLYMERS
Leon S. Minckler, Jr., and Morton Fefer, Metuchen, and Delmer L. Cottle, Highland Park, N.J., assignors to Esso Research and Engineering Company, a corporation of Delaware
No Drawing. Filed May 22, 1959, Ser. No. 814,965
16 Claims. (Cl. 260—85.3)

This invention relates to the preparation of halogen-containing rubbery coplymers of isoolefins and multi-olefins, and particularly to fast-curing halogenated isoolefin-multiolefin butyl rubber copolyers of high unsaturation and viscostiy produced by halogenation of the copolymers with halogen-containing compounds in the presence of such thiourea compounds as thiourea or derivatives of thiourea.

Heretofore it has been impossible to produce butyl rubber copolymers, with or without chemical modification, which contain halogen and are of high unsaturation without, at the same time, degrading the molecular weight. The desirability of such high unsaturation halogen-containing butyl rubber copolymers is apparent inasmuch as they would be readily vuncanizable or covulcanizable at an accelerated rate with or without other highly unsaturated rubbery polymers such as natural rubber or rubbery diene-styrene copolymers into materials exhibiting a combination of high extension modulus and high tensile strength.

In accordance with the present invention, it has now been discovered that isoolefin-multiolefin butyl rubber copolymers may be halogenated and simultaneously increased in unsaturation without molecular weight degradation, provided the halogenation is conducted in the presence of about 0.05 to 15, advantageously about 0.1 to 10.0 and preferably about 0.3 to 5.0 parts by weight of a thiourea compound such as thiourea and/or derivatives of thiourea, per 100 parts by weight of butyl rubber copolymer.

Butyl rubber copolymers comprise a major proportion, preferably about 85.0 to 99.5 weight percent, of a $C_4$ to $C_8$ isoolefin such as isobutylene, 2-methyl-1-butene or 3-methyl-1-butene, etc., with a minor proportion, preferably about 15 to 0.5 weight percent, of a multiolefin of about 4 to 14, preferably of about 4 to 6 carbon atoms, and are commonly referred to in patents and technical literature as "butyl rubber," or GR-I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the coplymer is preferably a conjugated diolefin such as isoprene, butadiene, dimethyl-butadiene, piperylene, or such multiolefins as cyclopentadiene, cyclohexadienes, myrcene, dimethallyl, allo-ocimene, vinyl fulvenes, etc. The copolymer comprising isobutylene and isoprene is preferred, although the copolymer may contain about 0.05 to 20.0, preferably about 0.2 to 5.0 parts by weight based on total reacting comonomers of such monoolefinic vinyl aromatic compounds as styrene, p-methylstyrene, alpha-methylstyrene, indene, dihydronaphthalene, dichlorostyrene, p-chlorostyrene, mixtures thereof, etc. Such a copolymer has a Staudinger molecular weight between about 10,000 to 500,000 and preferably between about 20,000 and 300,000, or a viscosity average molecular weight of about 100,000 or 250,000 to 2,000,000 or 3,000,000, and an iodine number between about 0.5 and 50.

To produce halogenated butyl rubber in accordance with the present invention, butyl rubber or preferably a solution of butyl rubber is contacted with the above amounts of thiourea or a thiourea derivative, and a sufficient amount of a halogenating agent to combine at least 0.5 weight percent halogen in the polymer, but not more than about one atom of combined fluorine or chlorine, nor more than about three atoms of combined bromine or iodine per double bond in the polymer.

In order to halogenate the rubbery copolymer to the extent above-mentioned, the halogenating temperatures are generally about —50° C. to +200° C., advantageously about 0° C. to +150° C. and preferably about 20° C. to 50° C., for a few minutes (e.g., 2) to several (e.g. 5) hours or more (i.e., 5 minutes to 10 days), depending upon the particular halogenating agent, copolymer molecular weight, type and amount of thiourea derivative, temperature, pressure, etc. Suitable pressures are about 0.1 to 500 p.s.i.a., although this is not particularly critical, atmospheric pressure being satisfactory. The preferred halogens are chlorine and/or bromine.

Suitable halogenating agents which may be employed are gaseous chlorine, liquid bromine, iodine monochloride, hydrogen fluoride, alkali metal hypochlorites or hypobromites, $C_4$ to $C_{10}$ tertiary alkyl hypochlorites or hypobromites, sulfur bromides or chlorides (particularly sulfuryl bromide or chloride), N-chlorosuccinimide, N-bromosuccinimide, N-bromo- or chloroacetanilide, N,N'-dichloro or -dibromo-5,5 dimethyl-hydantoin, tribromophenol bromide, N-chloro-acetamide, N-bromophthalimide, etc.

The modification reaction may be accomplished preferably by preparing a 1 to 80, or even more especially a 5 to 50 weight percent solution of such copolymers as above in a suitable inert liquid organic solvent such as a $C_1$ to $C_{10}$ halogenated liquid organic solvent such as chloroform, bromotrichloro methane, trichloroethane, chlorotribromo methane, carbon tetrachloride, chlorobenzene, dichloro-dibromo methane, $C_4$ to $C_{10}$ hydrocarbon solvents such as hexane, heptane, naphtha, mineral spirits, cyclohexane, alkyl substituted cycloparaffins, benzene, ethers such as tetrahydrofuran, di-n-butyl ether, mixtures thereof, etc., and adding thereto thiourea and/or thiourea derivatives and the halogenating agent, each of which may optionally be in solution, such as dissolved in a halogenated liquid organic solvent, hydrocarbon or ether.

Typical thiourea compounds suitable for use in accordance with the present invention include, among others, compounds represented by the following formulae, which may be used singly or in combination:

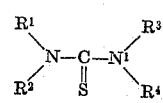

in which $R^1$ to $R^4$ include hydrogen, $C_1$ to $C_{18}$ alkyl groups, $C_6$ to $C_{18}$ aryl groups, $C_7$ to $C_{18}$ alkaryl groups and/or $C_7$ to $C_{18}$ aralkyl groups forming such compounds as thiourea, diethyl thiourea, dibutyl thiourea, diphenyl thiourea, mixtures thereof, etc.;

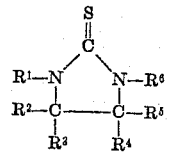

in which $R^1$ to $R^6$ include hydrogen or $C_1$ to $C_{12}$ alkyl groups forming such compounds as ethylene thiourea, N-methyl ethylene thiourea, N,N'-dibutyl ethylene thiourea, C-ethyl ethylene thiourea, C,C'-diisopropyl ethylene thiourea, mixtures thereof, etc.; or

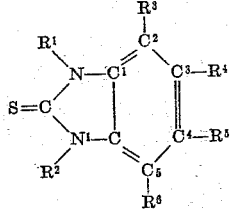

in which $R^1$ to $R^6$ include hydrogen or $C_1$ to $C_{12}$ alkyl groups forming such compounds as orthophenylene thiourea; N,N'-dimethyl orthophenylene thiourea; 3-isopropyl orthophenylene thiourea; 3,4-dibutyl orthophenylene thiourea; mixtures thereof, etc.

The resulting modified isoolefin-multiolefin-containing copolymer may be recovered by precipitation with oxygenated hydrocarbons, particularly alcohols or ketones such as isopropanol, acetone, methyl ethyl ketone, or any other known non-solvent for the rubbery copolymer, and dried under about 0.1 to 760 millimeters or higher of mercury pressure absolute at about 0° to 180° C., preferably about 50° to 150° C. (e.g. 60° C.). Other methods of recovering the modified polymer are by conventional spray or drum drying techniques. Alternatively, the solution of modified butyl rubber may be injected into a vessel containing steam and/or agitated water heated to a temperature sufficient to volatilize the solvent and form an aqueous slurry of the modified butyl rubber. This modified butyl rubber may then be separated from the slurry by filtration and drying, and recovered as a "crumb" or as a dense sheet or slab by conventional hot milling and/or extruding procedures. As so produced, the modified rubbery copolymer has a Staudinger molecular weight within the range of approximately 40,000 to 300,000, preferably about 50,000 to 2,000,000, and an iodine number of about 5.0 to 250, preferably about 10.0 to 100 c/g.

The unvulcanized modified reaction products formed are then vulcanized advantageously in the presence of about 1 to 30 or 50, preferably about 3 to 20 parts by weight of zinc oxide and/or an organic amine, as well as about 0 to 20 parts by weight of sulfur per 100 parts by weight of modified rubbery copolymer, with or without the addition of up to about 5 or 10 parts by weight of a thiuram sulfide and/or thiocarbamate, under vulcanization temperatures of between about 250° and 450° F. for several minutes (e.g., 2) up to five hours or more, depending upon the state of cure desired. Also, the resulting compounded halogenated copolymer to be vulcanized may include conventional quantities of such materials as diisothiocyanates, quinone dioxime and its derivatives, benzothiazyl disulfide, mercaptobenzothiazole, plasticizer oils, fillers, waxes, resins, dialkyl tin sulfides, etc. Normally the cure is effected for about five minutes to three hours at temperatures of between about 270° and 350° F. The resulting modified reaction products formed have utility as rubber insulation, in air springs, hosing, curing bladders, belting, proofed goods, tire inner linings, tire sidewalls, tire carcasses, tire treads and tire bead areas, etc.

The thiuram sulfides found particularly useful for the purposes of the present invention include, among others, $C_1$ to $C_{10}$ alkyl (or $C_6$ to $C_{12}$ aryl, aralkyl or alkaryl) thiuram sulfides such as tetramethyl thiuram monosulfide, tetramethyl thiuram disulfide, tetraethyl thiuram disulfide, tetrabutyl thiuram disulfide, tetraamyl thiuram disulfide, di-N-penta-methylene thiuram tetrasulfide, tetraphenyl thiuram disulfide, tetrabenzyl thiuram disulfide, N-dimethyl-N'-phenyl aminoethyl-N'-phenyl thiuram disulfide, mixtures thereof, etc.

The thiocarbamates found to be particularly useful for the purposes of the present invention include, among others, such materials as metal or amine salts of thio-carbamic acids such as tellurium diethyl dithiocarbamate, zinc dimethyl dithiocarbamate, copper dimethyl dithiocarbamate, cadmium diamyl dithiocarbamate, zinc dibutyl dithiocarbamate, selenium dipropyl or diisopropyl dithiocarbamate, lead dimethyl dithiocarbamate, bismuth dimethyl dithiocarbamate, lead (phenylaminoethyl) phenyl dimethyl dithiocarbamate, 2,4-dinitrophenyl dimethyl dithiocarbamate, potassium diethyl dithiocarbamate, zinc-N-pentamethylene dithiocarbamate, zinc dibenzyl dithiocarbamate, N-pentamethylene ammonium pentamethylene dithiocarbamate, zinc (phenyl aminoethyl) phenyl dimethyl dithiocarbamate, mixtures thereof, etc.

In order to more fully illustrate but not to limit the present invention, the following experimental data are given:

Example I

A 12.5 weight percent solution in hexane of an isobutylene-isoprene butyl rubber copolymer having a viscosity average molecular weight of 485,000, a Mooney viscosity at 212° F. for 8 minutes of 75, and an iodine number of 11.2 cg./g., was brominated in the presence of 5 parts per hundred of rubber of bromine and 1.9 p.h.r. of thiourea for two hours at 67° C. The product formed was precipitated with methyl ethyl ketone, washed with water and dried under approximately 1 millimeter of pressure absolute at 70° C. for 16 hours.

The same general procedure was again repeated except that no thiourea was employed with the following results compared to bromination in the presence of thiourea:

| Sample | (a) Regular Bromination | (b) Thiourea Bromination |
| --- | --- | --- |
| Iodine No., cg./g. | 3.2 | 6.1 |
| Molecular Weight | 390,000 | 490,000 |
| Intrinsic Viscosity | 1.30 | 1.44 |
| Bromine Content, percent | >1.5 | >1.5 |

The above data show that halogenation of butyl rubber in the presence of a thiourea compound results in a desirable increased unsaturation of the polymer with a simultaneous increase in intrinsic viscosity.

Example II

In order to show that halogenating butyl rubber, in the presence of thiourea compounds, results in faster curing stocks into vulcanizates of improved extension modulus and tensile strength, 100 parts by weight each of sample (a) and same (b) were compounded with 50 parts by weight of the filler SAF carbon black, 0.5 part by weight of the lubricant stearic acid, and 5, 2 and 1 parts by weight respectively of the curatives zinc oxide, sulfur and the accelerator tellurium diethyl dithiocarbamate, with the following results when cured for 15 or 45 minutes:

| Sample | (a) Regular Brominated Butyl | (b) Thiourea Brominated Butyl |
| --- | --- | --- |
| Cured 15 min. at 287° F.: | | |
| 300% Modulus (p.s.i.) | 2,060 | 2,710 |
| Tensile Strength (p.s.i.) | 3,120 | 3,460 |
| Elongation (percent) | 420 | 380 |
| Cured 45 min. at 287° F.: | | |
| 300% Modulus (p.s.i.) | 2,100 | 3,280 |
| Tensile Strength (p.s.i.) | 3,445 | 3,770 |
| Elongation (percent) | 440 | 370 |
| Cured 45 min. at 307° F.: | | |
| 300% Modulus (p.s.i.) | 1,920 | 2,900 |
| Tensile Strength (p.s.i.) | 2,935 | 3,650 |
| Elongation (percent) | 405 | 390 |

The above data show that the thiourea halogenation of butyl rubber results in faster curing stocks having improved extension moduli and tensile strengths.

Resort may be had to modifications and variations of the disclosed embodiments without departing from the

What is claimed is:

1. A composition which comprises the reaction product formed by halogenating a rubbery isoolefin-multiolefin copolymer of a major portion of a $C_4$ to $C_8$ isoolefin and a minor portion of a $C_4$ to $C_{14}$ multiolefin in the presence of 0.05 to 15.0 weight percent based on copolymer of a thiourea compound selected from the group consisting of thiourea, derivatives of thiourea having in their structure the characteristic

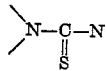

group and mixtures thereof.

2. A composition according to claim 1 containing at least about 0.5 weight percent of combined chlorine and having an iodine number of at least about 5.0 cg./g.

3. A composition according to claim 1 containing at least about 0.5 weight percent of combined bromine and having a viscosity average molecular weight of at least about 450,000.

4. A composition according to claim 1 which has been vulcanized in the presence of added curatives at a temperature level of between about 250° and 450° F. until it exhibits an extension modulus at 300% elongation of at least about 2500 p.s.i.

5. A composition according to claim 1 in which the halogenation reaction in the presence of a thiourea compound is at a temperature level of between about −50° C. and +200° C. for between about 2 minutes and 10 days.

6. A composition comprising a rubbery polymer having a Staudinger molecular weight of between about 20,000 and 300,000 comprising atoms of hydrogen, carbon and halogen, containing in its structure a major proportion of hydrocarbon units derived by the polymerization of isoolefins containing about 4 to 8 carbon atoms and a minor proportion of at least one multiolefin having about 4 to 14 carbon atoms, said polymer containing at least about 0.5 weight percent combined halogen but not more than about one atom of combined halogen per polymer double bond; said polymer being produced by halogenation in the presence of 0.5 to 15.0 weight percent based on rubbery polymer of a thiourea compound selected from the group consisting of thiourea, derivatives of thiourea having in their structure the characteristic

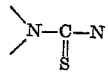

group, and mixtures thereof.

7. A composition according to claim 6 in which the thiourea compound comprises thiourea.

8. A composition according to claim 6 in which the thiourea compound comprises ethylene thiourea.

9. A composition according to claim 6 in which the thiourea compound comprises diphenyl thiourea.

10. A composition according to claim 6 in which the thiourea compound comprises N-methyl ethylene thiourea.

11. A composition according to claim 6 in which the thiourea compound comprises orthophenylene thiourea.

12. A process for modifying rubbery isoolefin-multiolefin copolymers of a major portion of a $C_4$ to $C_8$ isoolefin and a minor portion of a $C_4$ to $C_{14}$ multiolefin which comprises dissolving said copolymer in a solvent and halogenating the copolymer while dissolved in the solvent in the presence of 0.5 to 15.0 weight percent based on copolymer of a thiourea compound selected from the group consisting of thiourea, derivatives of thiourea having in their structure the characteristic

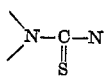

group and mixtures thereof, at a temperature of between about 0° and 150° C. for between about 5 minutes and 5 hours.

13. A process according to claim 12 in which there is present during reaction about 0.1 to 10.0 weight percent based on copolymer of the thiourea compound.

14. The process of claim 12 in which said thiourea compound is thiourea.

15. A vulcanized product having an extension modulus at 300% elongation of at least about 2500 p.s.i. containing the reaction product formed by halogenating a solution of butyl rubber with a halogenating agent in the presence of 0.5 to 15.0 weight percent based on butyl rubber of a thiourea compound selected from the group consisting of thiourea, derivatives of thiourea having in their structure the characteristic

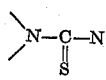

group and mixtures thereof.

16. A process for modifying rubbery isoolefin-multiolefin copolymers of a major portion of a $C_4$ to $C_8$ isoolefin and a minor portion of a $C_4$ to $C_{14}$ multiolefin which comprises, admixing said copolymer with a solvent and halogenating the copolymer in the presence of 0.5 to 15 wt. percent based on copolymer of a thiourea compound selected from the group consisting of thiourea, derivatives of thiourea having in their structure the characteristic

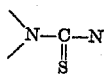

group, and mixtures thereof, at a temperature of between about −50° C. to +200° C. for at least 2 minutes to about 10 days.

References Cited in the file of this patent
UNITED STATES PATENTS

| | | |
|---|---|---|
| 2,544,746 | Baum | Mar. 13, 1951 |
| 2,732,354 | Morrissey et al. | Jan. 24, 1956 |
| 2,804,447 | Naylor | Aug. 27, 1957 |

OTHER REFERENCES

Schildknecht: Vinyl and Related Polymers, John Wiley & Sons, Inc., 1952, p. 581.

Billmeyer: Textbook of Polymer Chemistry, InterScience Publishers, Inc., 1957, p. 443.

Flory: Principles of Polymer Chemistry, Cornell University Press, 1953, pages 457–458.